United States Patent [19]
Tanner

[11] 3,851,267
[45] Nov. 26, 1974

[54] MODULAR DISC LASER

[75] Inventor: Robert L. Tanner, Albuquerque, N. Mex.

[73] Assignee: The United States of America as represented by the United States Atomic Energy Commission, Washington, D.C.

[22] Filed: Oct. 18, 1972

[21] Appl. No.: 298,738

[52] U.S. Cl. .............................. 330/4.3, 331/94.5
[51] Int. Cl. .............................................. H01s 3/02
[58] Field of Search..... 331/94.5 E, 94.5 D, 94.5 V; 330/4.3; 350/310

[56] References Cited
UNITED STATES PATENTS

| | | | |
|---|---|---|---|
| 3,423,691 | 1/1969 | Chernoch et al. | 331/94.50 |
| 3,500,231 | 3/1970 | Tomiyasu et al. | 339/4.3 |
| 3,642,353 | 2/1972 | Field | 350/310 |
| 3,679,996 | 7/1972 | Almasi et al. | 330/4.3 |

OTHER PUBLICATIONS

Tuttle, "Precise Adjustment", Feb. 16, 1967, pp. 227–229, Machine Design.

Durie, "Stability of Optical Mounts," May 23, 1968, pp. 184–190, Machine Design.

Kantorskie et al., "Efficient, Compact, and Lightweight Glass Laser Modules," June, 1971, pp. 298–299, IRRR, J.Q.R, QR-7, No. 6.

Primary Examiner—Maynard R. Wilbur
Assistant Examiner—N. Moskowitz
Attorney, Agent, or Firm—John A. Haran; Paul D. Gaetjens; Edward C. Walterscheid

[57] ABSTRACT

A disc laser amplifier system comprising a plurality of modules designed around individual discs of laser glass. Each module represents an individual amplifier unit and contains a disc of laser material, a disc holder, helical lamps for pumping the disc, means for cooling the lamps, and appropriate reflectors. The disc holder is mounted to the ends of the module to prevent interference with the optical pumping and to allow easy rotation of the disc to achieve a desired polarization.

9 Claims, 8 Drawing Figures

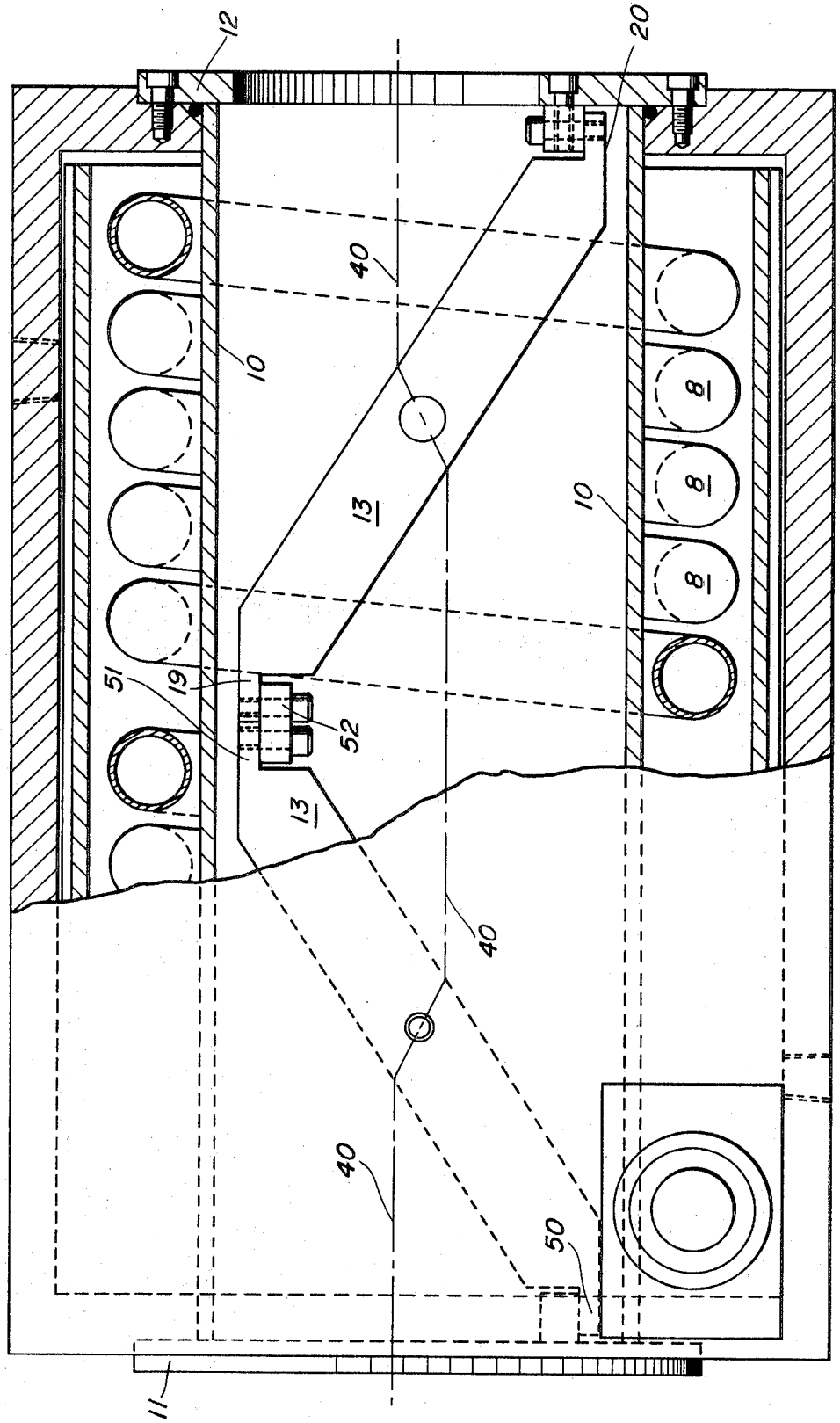

MODULAR DISC LASER

BACKGROUND OF THE INVENTION

The invention described herein was made in the course of, or under, a contract with the U.S. ATOMIC ENERGY COMMISSION. It relates to a modular disc laser amplifier system and more particularly to a disc laser module having improved disc mounting.

Disc laser amplifiers are considered to be the optimum glass laser systems for achieving high energy outputs. A disc laser amplifier system may be unitary in nature or of modular construction. In a modular system each disc is mounted in a separate module with its own lamps for optical pumping, cooling system for the lamps, and reflectors. Although an individual module constitutes an amplifier in its own right, amplifier systems are usually made up by rigidly aligning a desired number of modules along a common optical axis. A modular system has certain advantages over a unitary system in which a plurality of laser discs are mounted in a single housing. The number of discs used—and hence the laser output—may readily be varied by changing the number of modules in the system. In the event of lamp failure, an individual module can be replaced quickly with another one, so that the entire system is not out of commission while lamps are being changed. Additionally, if the lamp failure is catastrophic, i.e., the lamp explodes, repair or replacement of damaged components is much more rapidly achieved with individual modules than in a unitary structure.

One example of a modular system is that disclosed by Tomiyasu et al. in U.S. Pat. No. 3,500,231, issued Mar. 10, 1970. While the system revealed in that patent has the advantages discussed above, the means used to mount a disc within a module is disadvantageous in that it precludes optimum optical pumping of the disc and further is not readily amenable to removing the disc or rotating it to achieve a desired angle of polarization.

SUMMARY OF THE INVENTION

I have developed a modular disc laser amplifier system in which the manner of mounting the discs within the modules overcomes certain of the disadvantageous features found in the mounting schemes taught in the previous art. In general, the amplifier system consists of a plurality of modules together with means for rigidly aligning the modules along a common optical axis. In a preferred embodiment, each module comprises (a) a housing having aligned openings in opposing end walls, (b) a disc of laser material, (c) means for holding the disc at a desired angle on the axis of the aligned openings in the housing, (d) a plurality of helical lamps so arranged that the disc of laser material is centered within the lamp helices, (e) reflector means forming a cylinder around the lamps, and (f) means for cooling the lamps. The disc of laser material is held on the axis of the module end openings by a disc holder having flanges adapted to mount to mating flanges on end plates attached to the module end openings. The end plates are easily rotatable. Because the disc is mounted to them through the disc holder, it is readily rotated about the optical axis to achieve a desired angle of polarization by merely rotating the end plates as required. Further, the disc may be removed or interchanged by removing the end plates. Finally, the disc holder is so designed that it holds the disc mounted securely in place while still allowing thermal expansion of the disc material caused by operation of the system.

In an alternative embodiment two discs are mounted within one module. One flange of each disc holder is mounted to an end plate whereas the two disc holders are attached together in rigid alignment by means of a joining plate mated to their opposite flanges.

BRIEF DESCRIPTION OF THE DRAWINGS

FIG. 7 shows a partially cutaway view of a module having two discs mounted within it.

DESCRIPTION OF THE PREFERRED EMBODIMENTS

Figure 1:
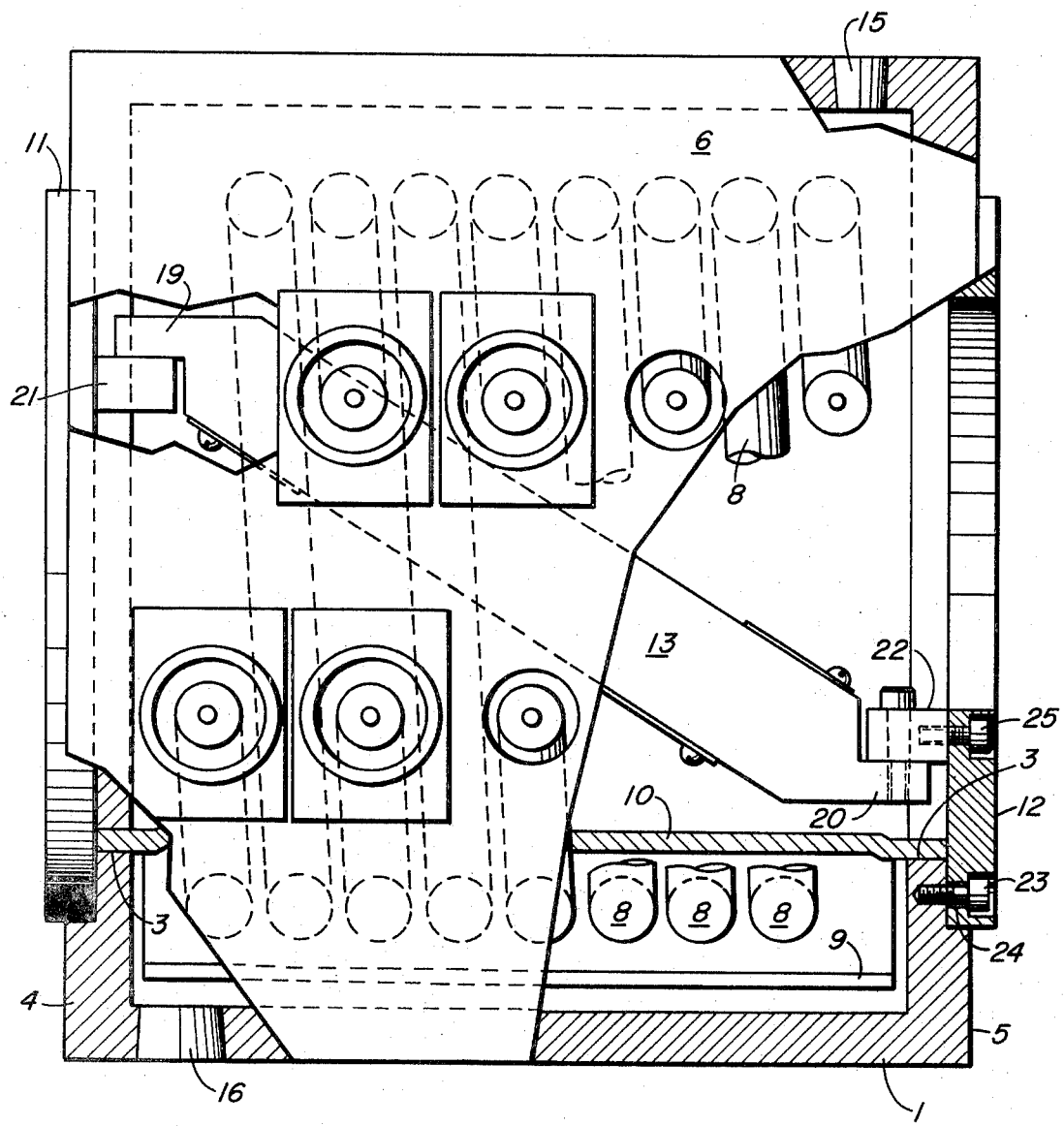
FIG. 1 is a partially cutaway top view of a disc laser amplifier module.
Figure 2:
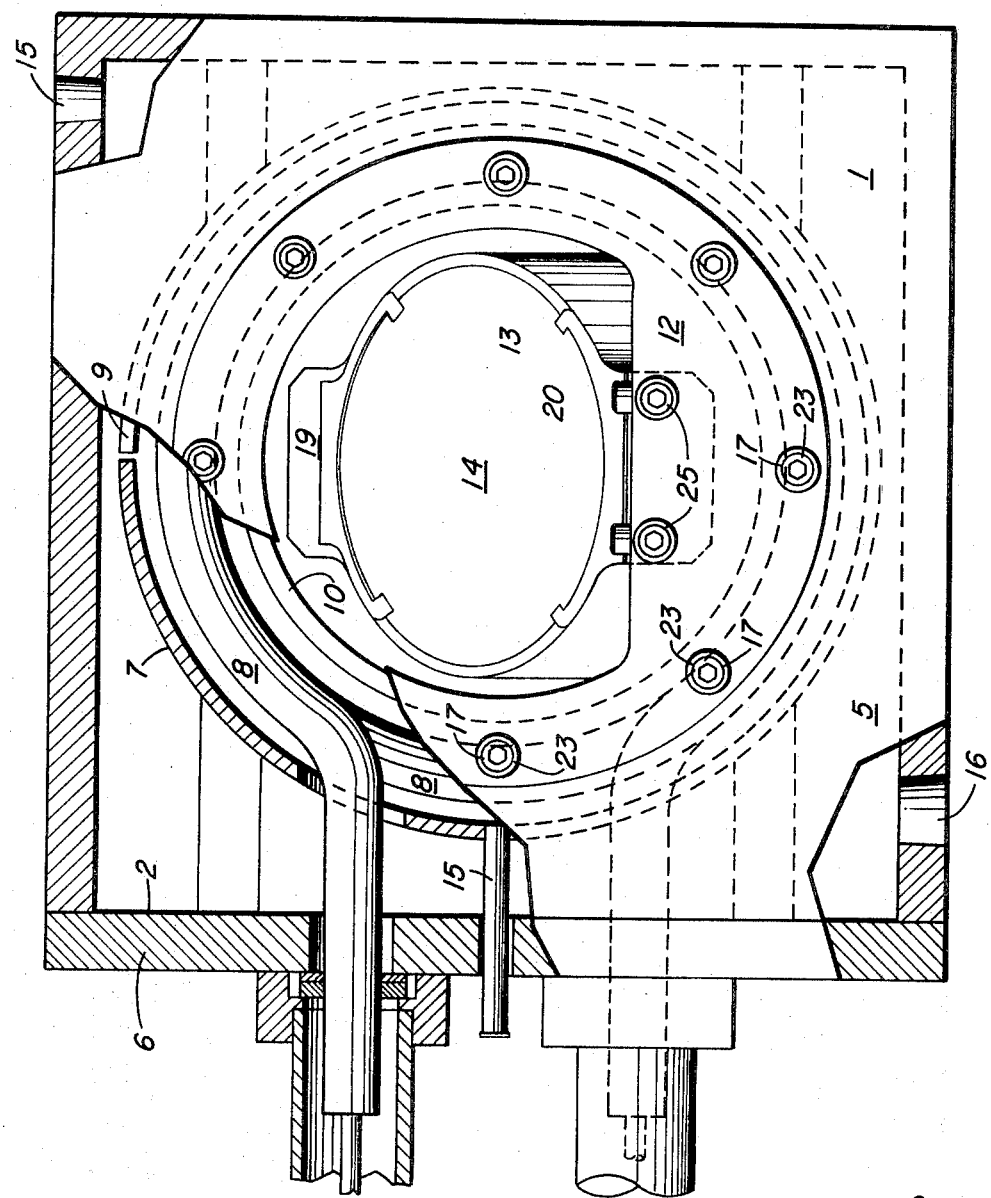
FIG. 2 is a partially cutaway end view of the module of FIG. 1.

An individual module of the disc laser amplifier system is shown in FIGS. 1 and 2. It consists of a metal housing 1 of about cubic dimensions open at the top 2, with large diameter holes 3 through the two ends 4, 5; a top plate 6 of electrical insulating material on which is mounted an upper reflector 7 and a plurality of lamps 8; a lower reflector 9; a sleeve 10 of material which is transparent to light of the desired pumping wavelengths; two end plates 11, 12; a disc holder 13 and its related hardware; and a disc 14 of laser material. Housing 1 has a coolant entry 15 and exit 16 whereby a continuous flow of coolant may be circulated around lamps 8 and a space between housing 1, top 2, and sleeve 10. This coolant is typically water but may be any other fluid that absorbs minimally that wavelength used to pump the laser material of disc 14. The coolant fluid may contain a solute for absorbing undesired lamp wavelengths and/or spontaneous radiation from the laser material. Alternatively, sleeve 10 may be of a composition which will absorb these radiations. Photodiodes 15 are provided for monitoring the light output from each lamp 8. Within each module a disc 14 of laser material is held at the Brewster angle to the optical axis by means of disc holder 13. Disc 14 may be aligned at other than the Brewster angle; however, this angle provides the optimum efficiency of light output. Disc holder 13 shades the edges of disc 14 from lamps 8 to prevent undesirable edge pumping. Flanges 19, 20 on disc holder 13 are mounted respectively to mating flanges 21, 22 on end plates 11, 12. End plates 11, 12 are provided with multiple uniformly spaced mounting means 17 (shown only for end plate 12) to housing 1. By rotating end plates 11, 12 on mounting means 17, disc 14 is rotated about the optical axis so as to achieve the desired angle of polarization. Mounting means 17 may be any suitable connector as, for example, screws 23 inserted through holes 24 in end plates 11, 12. Mounting disc holder 13 to end plates 11, 12 also allows ready removal of the laser material from the module. This is easily accomplished, for example, by disassembling mating flange 22 from end plate 12 by removal of screws 25, and removal of end plate 11 from housing 1. When end plate 11 is removed, disc holder 13 and disc 14, being attached to it, come along with it. Mounting disc holder 13 to end plates 11, 12 also eliminates shading of lamps 8 by the mounting means.

Lamps 8 may be linear, circular, or helical; however, helical lamps are preferred. Helical lamps have inherent mechanical advantages over linear lamps which give more favorable distribution of stresses. Further, helical lamps are less affected by whatever "loading" results from the presence of adjacent lamps than are linear lamps, as most of the radiation absorbed from outside is "self" radiation. Helical lamps are also advantageous over circular lamps in that lesser numbers are required per module. Lamps 8 may be either flash lamps or continuously operating lamps depending on the mode of operation of the laser system. If the laser system operates in the continuous wave mode or is very frequently pulsed, then cooling of the laser material is desirable. This may readily be accomplished by flowing a cooling fluid through the module.

Disc 14 of laser material is not limited to the shape shown by example in FIGS. 1 and 2. As used herein, disc is defined as the space bounded by a cylinder having parallel planar end surfaces transverse to the longitudinal axis of the cylinder, with the longitudinal dimension of the cylinder being less than its diameter. The cross section of the laser material taken at right angles to the longitudinal axis may therefore be circular, elliptical, etc., as desired. The module is capable of accommodating discs of varying diameter; however, the size of disc is ultimately limited in this or any other design by superfluorescence losses. Thus discs of any shape can be readily accommodated, and thicknesses up to the maximum imposed by pump light absorption may be used.

In a preferred embodiment, a plurality of modules of the type shown in FIGS. 1 and 2 are used to amplify to high energies laser pulses of from 10 psec to 30 nsec duration with a repetition rate of about one shot every five minutes. The material of disc 14 is neodymium glass, more specifically, silicate glass doped with about 2 percent neodymium. Lamps 8 are helical xenon flash lamps and sleeve 10 is a quartz tube. Alternatively sleeve 10 may be composed of samarium-doped glass. Reflectors 7, 9 are composed of polished brass, gold plated. The coolant fluid for lamps 8 may be nitrogen gas. Top plate 6 is phenolic plastic and housing 1 is aluminum.

Figure 3:
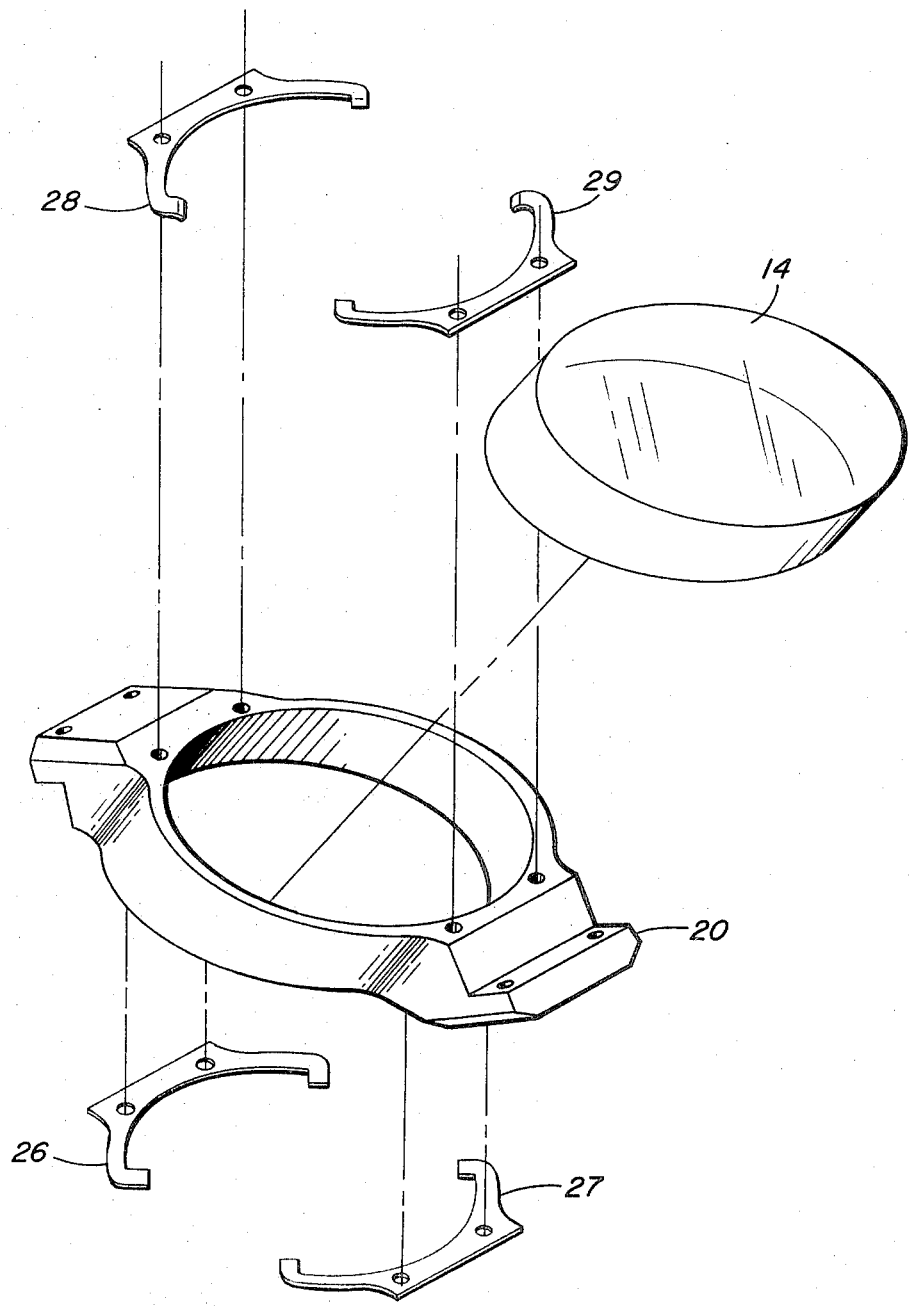
FIG. 3 shows in exploded detail the disc holder used with the module of FIGS. 1 and 2.

Disc holder 13 of FIGS. 1 and 2 is shown in an exploded detail in FIG. 3. It is adapted to conform to the edge shape of disc 14 since one of its functions is to prevent edge pumping of the laser material. It will be understood therefore that the shape of disc holder 13 is dependent on the shape of disc 14. Disc holder 13 has a slightly larger circumference than does disc 14 so as to allow for thermal expansion of disc 14 during operation of the system. Disc 14 is held firmly within disc holder 13 by means of disc stops 26, 27 and disc springs 28, 29. This readily allows longitudinal thermal expansion of disc 14 so that the optical axis of the system is not distorted by such expansion.

Figure 5:
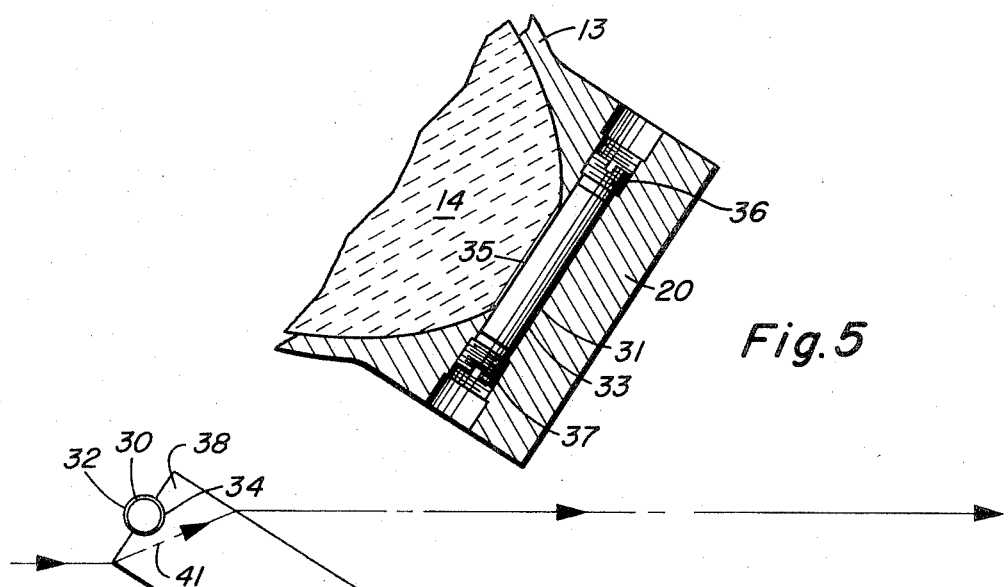
FIG. 5 shows a cross-sectional view through plane X—X of the disc holder of FIG. 4.
Figure 6:
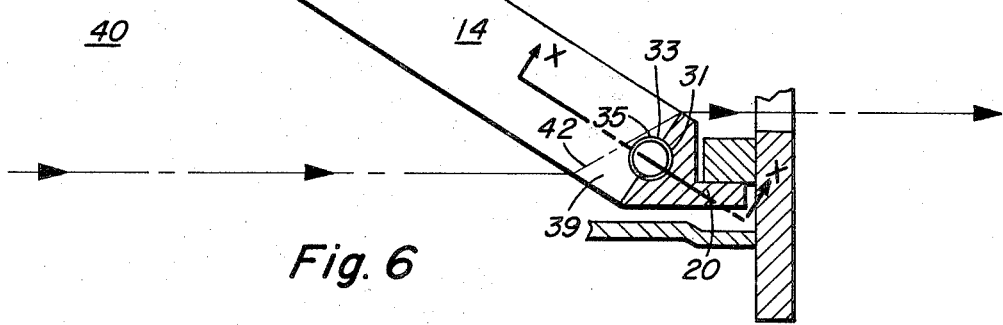
FIG. 6 shows another cross-sectional view of the disc holder of FIG. 4.
Figure 4:
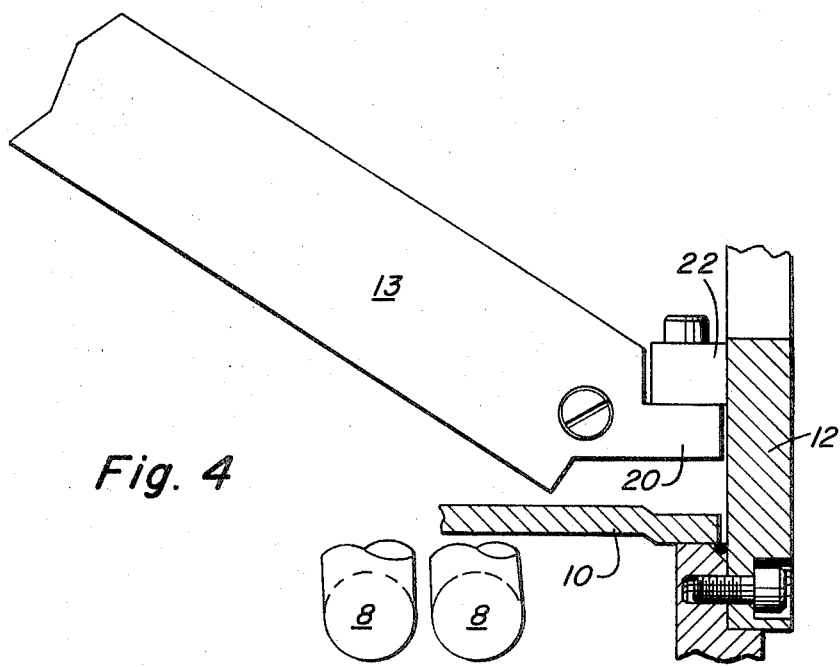
FIG. 4 shows a partial view of another embodiment of a disc holder.

Another embodiment of disc holder 13 is shown in FIGS. 4, 5, and 6. In this embodiment, disc 14 is held within disc holder 13 by means of springs 30, 31 inserted in wells 32, 33 in disc holder 13 and passing through grooves 34, 35 in disc 14. Springs 30, 31 consist of thin metal sheets spiral rolled. When disc 14 is inserted into disc holder 13, springs 30, 31 come into contact with grooves 34, 35 and are placed in moderate compression. This compression is sufficient to hold disc 14 firmly in alignment within disc holder 13. As disc 14 is heated during operation of the system, springs 30, 31 are placed in greater compression by thermal expansion of the disc. As disc 14 cools this compression lessens, but there is always sufficient force exerted by springs 30, 31 to maintain disc 14 in the desired alignment with disc holder 13. Springs 30, 31 are retained axially by screws 36, 37.

An advantage of this embodiment of disc holder 13 is shown in FIG. 6. Grooves 34, 35 are located in regions 38, 39 in disc 14 through which laser beam 40 does not pass. Note that the refraction at the edges 41, 42 of beam 40 is sufficient to remove the beam from region 38, but not sufficient to invade region 39. Thus in this embodiment disc holder 13 does not shade or otherwise interfere in any way with that portion of disc 14 swept by beam 40.

Although the modular embodiment described herein has thus far shown only one disc within a module, the invention is not to be so limited. Thus, for example, a module may incorporate more than one disc as shown in FIG. 7. FIG. 7 shows two discs mounted in a module within disc holder 13 of the type shown in FIGS. 4, 5, and 6. Flanges 20, 50 of the disc holders are mounted to end plates 11, 12 respectively, whereas flanges 19, 51 are mounted to joining plate 52. The two disc holders—and the discs therein—are thus held in rigid alignment along the optical axis of the module.

Figure 8:
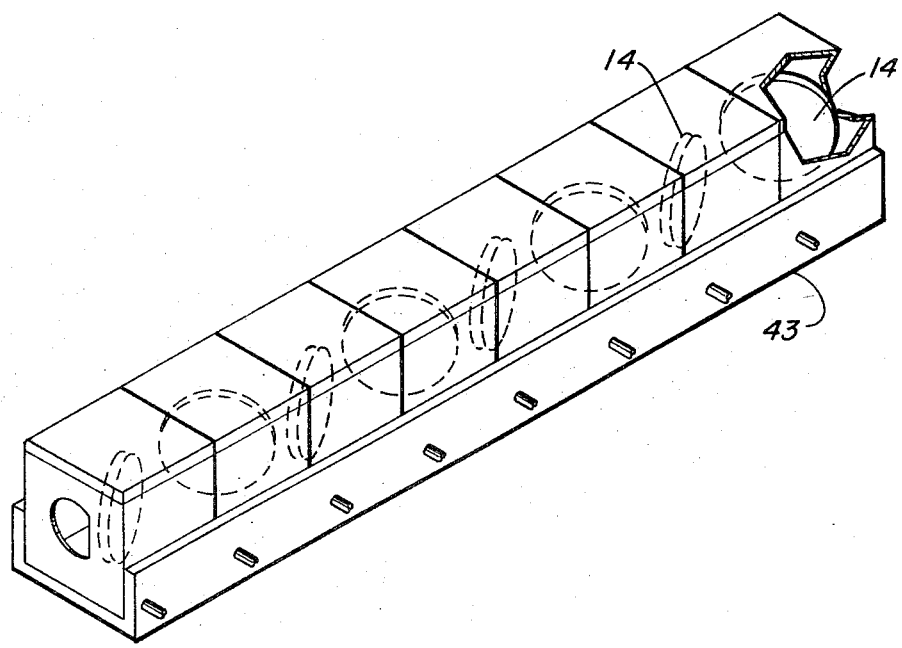
FIG. 8 is a schematic representation of a modular disc laser amplifier system.

FIG. 8 shows a plurality of modules rigidly aligned along a common optical axis to form a modular disc laser amplifier system. A common support 43 is used to achieve this rigid alignment. Discs 14 within the modules are placed at alternating Brewster angles so that refraction of beam 40 is balanced.

What I claim is:

1. In a module for a modular disc laser amplifier system comprising (a) a housing having aligned openings in opposing end walls for admitting and emitting a beam of laser light, (b) a disc of laser material, (c) means for holding said disc centered at a desired angle on an axis of said aligned openings, (d) means for optically pumping said disc, (e) means for cooling said optical pumping means, and (f) reflector means between said housing and said optical pumping means for directing light inwardly toward the axis of said aligned openings, the improvement consisting of mounting said means for holding said disc centered at a desired angle on the axis of said aligned openings to the end plates of said housing having aligned openings therein.

2. The module of claim 1 wherein said means for holding said disc centered at a desired angle on the axis of said aligned openings comprises (a) inwardly disposed flanges mounted on said opposing end walls, (b) a disc holder having flanges so disposed as to mate with said inwardly disposed flanges, (c) means for connecting said mated flanges, and (d) means for holding said disc within said disc holder.

3. The module of claim 2 wherein said disc holder is adapted to (a) shade the edges of said disc, and (b) allow peripheral thermal expansion of said disc.

4. The module of claim 3 wherein said means for holding said disc within said disc holder comprises a plurality of disc stops and disc springs mounted to said disc holder, each of said disc stops being opposed to one of said disc springs, said disc stops and disc springs consisting of thin metal arcs conforming to the periphery of said disc holder and having inwardly directed tabs at the ends of said arcs, said tabs being adapted to hold said disc in firm alignment within said disc holder while allowing thermal expansion of said disc.

5. The module of claim 3 wherein said means for holding said disc within said disc holder comprises a plurality of grooves in the edge of said disc, a plurality of wells in said disc holder, said wells penetrating the inner periphery of said disc holder and said grooves in said disc conforming to said wells in said disc holder, and a plurality of cylindrical springs inserted in said wells and through said grooves in said disc, said springs being in sufficient compression to assure firm alignment of said disc within said disc holder.

6. The module of claim 5 wherein said springs have sufficient compressibility to allow thermal expansion of said disc.

7. The module of claim 5 wherein said grooves are located in regions of said disc not traversed by laser light.

8. The module of claim 1 wherein said optical pumping means is a plurality of helical flash lamps, said lamps positioned in encircling relationship relative to said disc.

9. A module for a modular disc laser amplifier system comprising (a) a housing having aligned openings in opposing end walls for admitting and emitting a beam of laser light, (b) one or more discs of laser materials, (c) means for holding said disc or discs centered at a desired angle on the axis of said aligned openings, said means being mounted to the end plates of said housing having aligned openings therein and said means being adapted to allow optical pumping of the surfaces of said disc or discs, (d) means for optically pumping said disc or discs, (e) means for cooling said optical pumping means, and (f) reflector means between said housing and said optical pumping means for directing light inwardly toward the axis of said aligned openings.

* * * * *